United States Patent Office 3,333,809
Patented Aug. 1, 1967

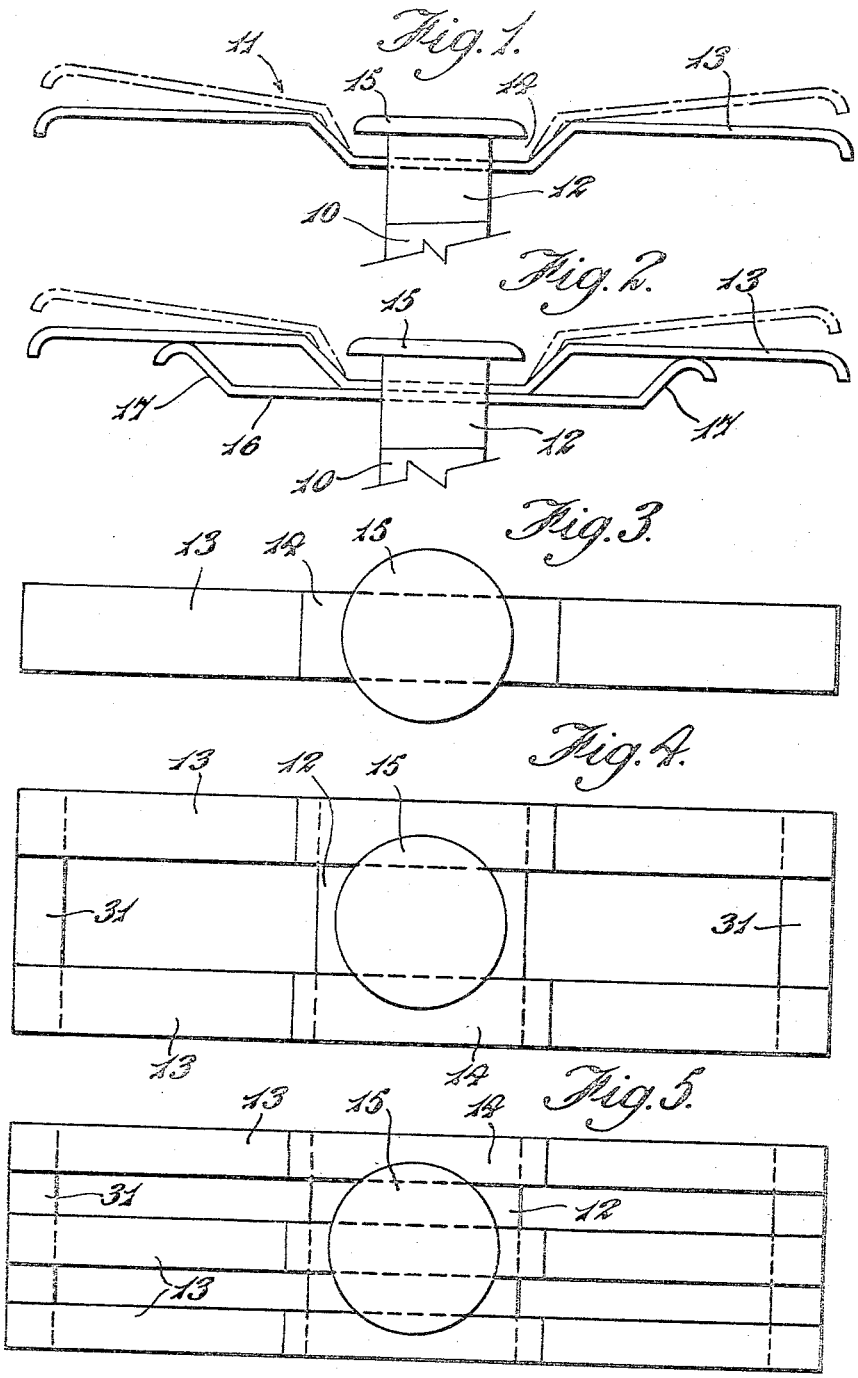

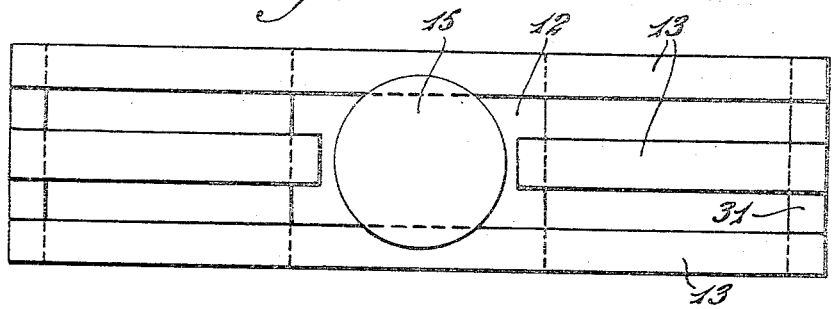
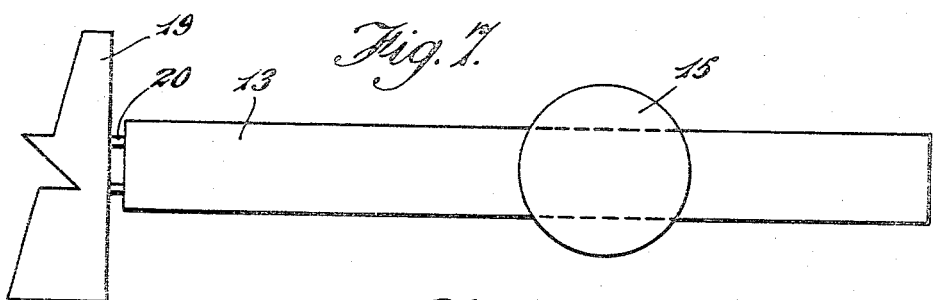
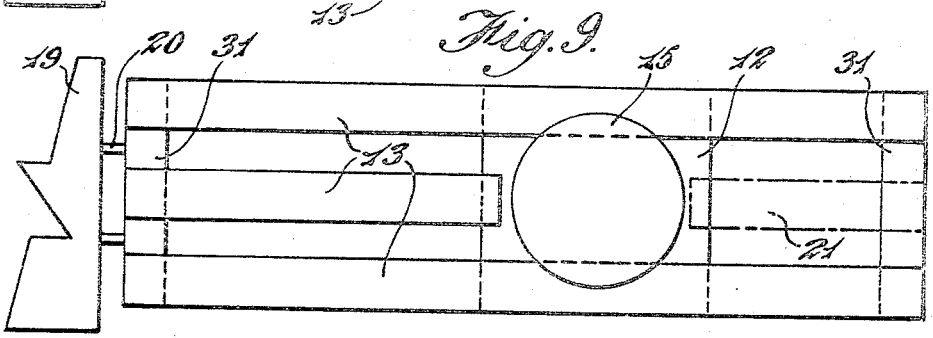

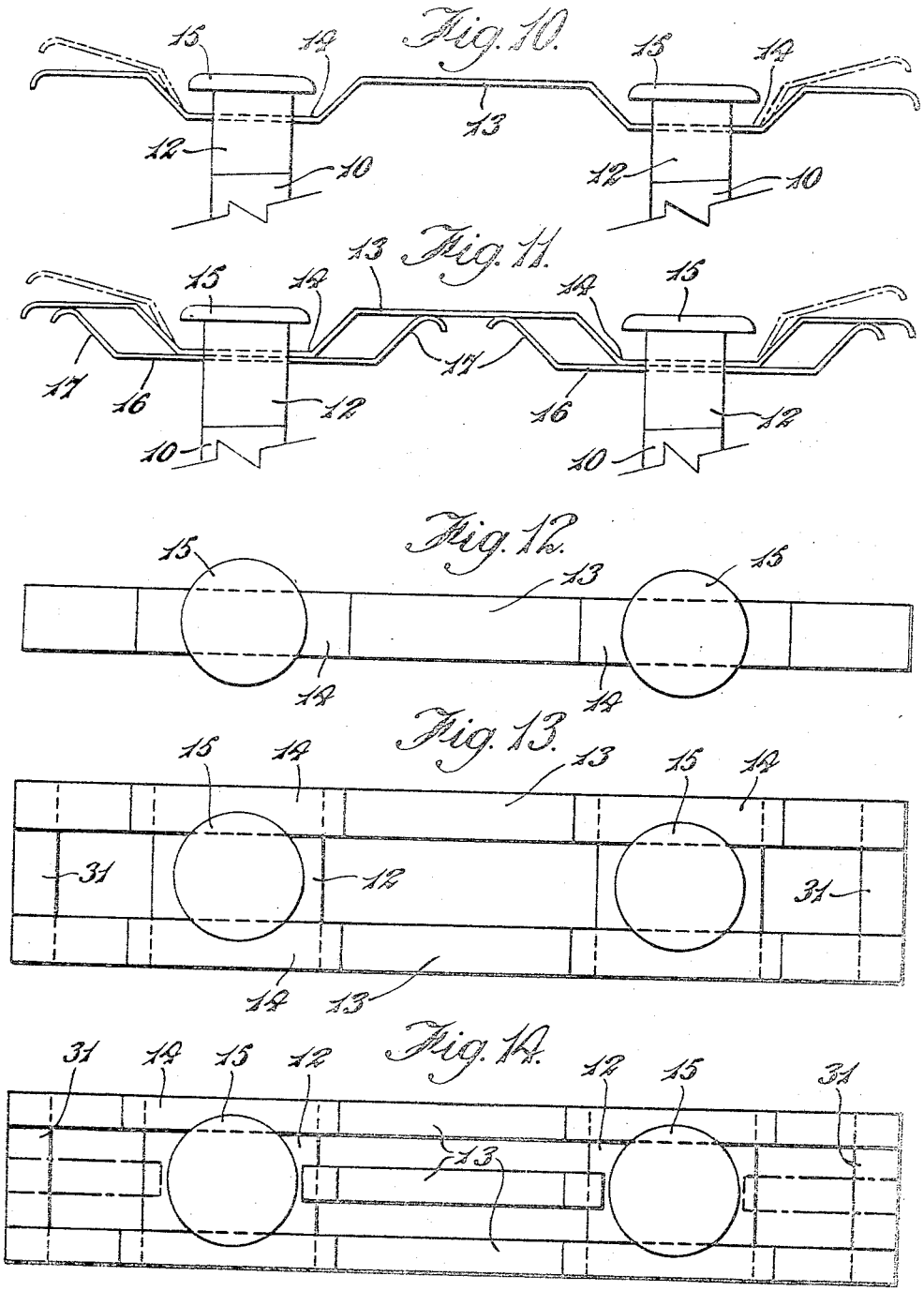

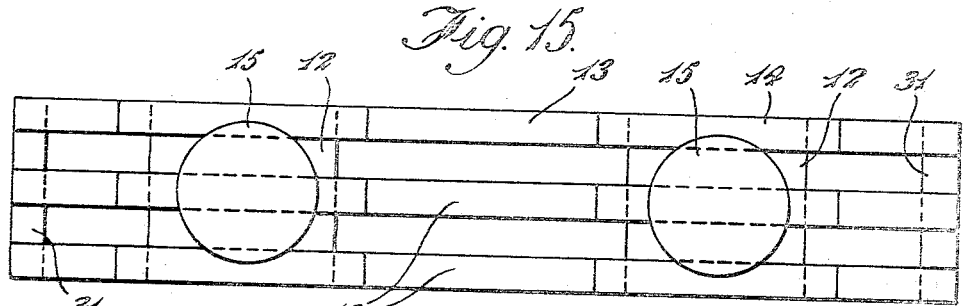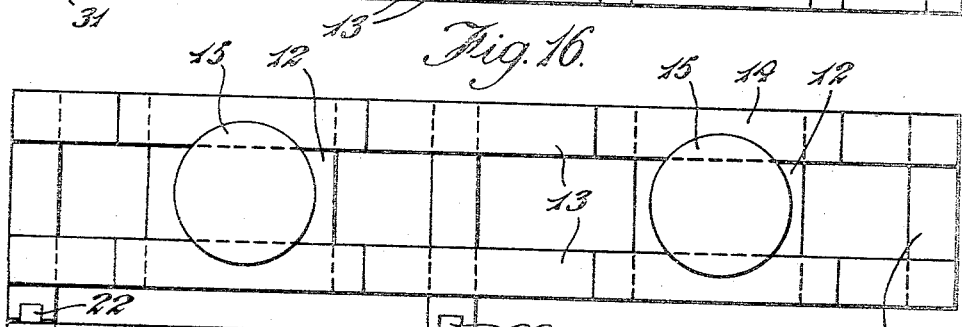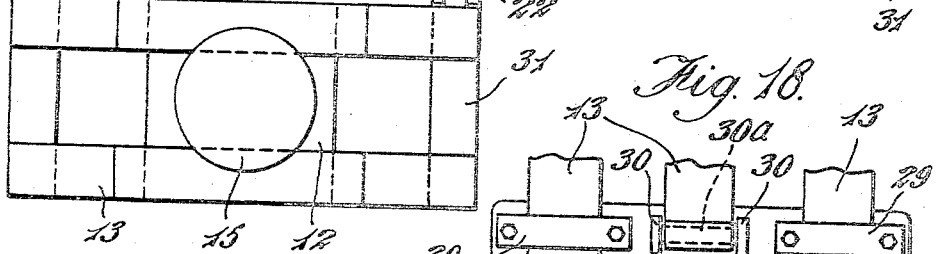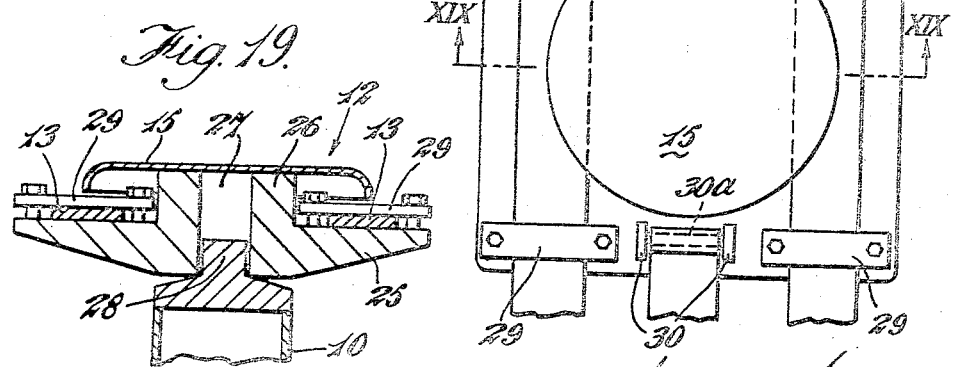

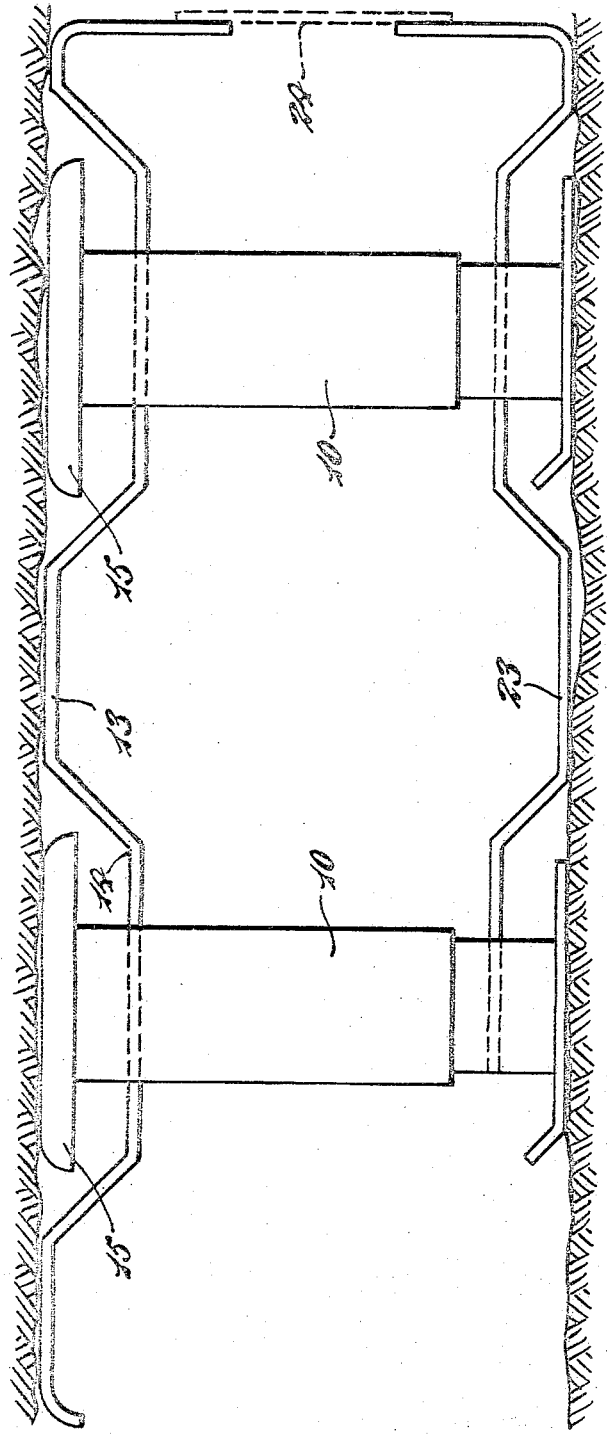
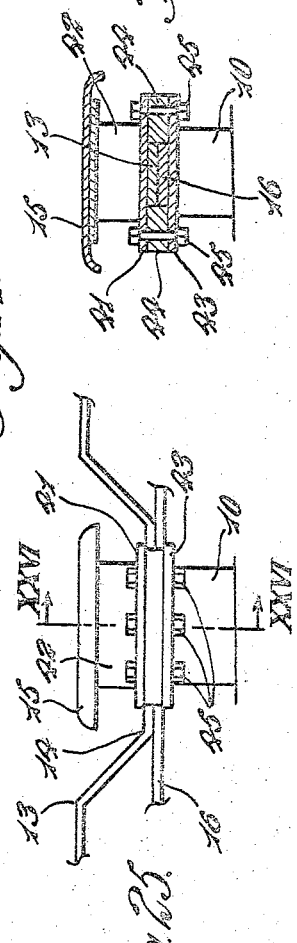

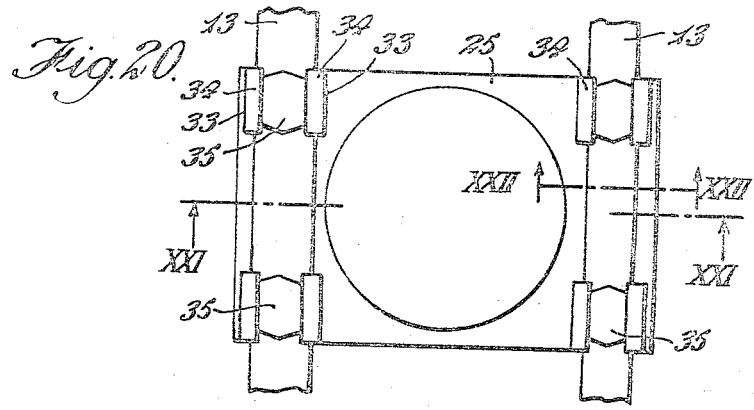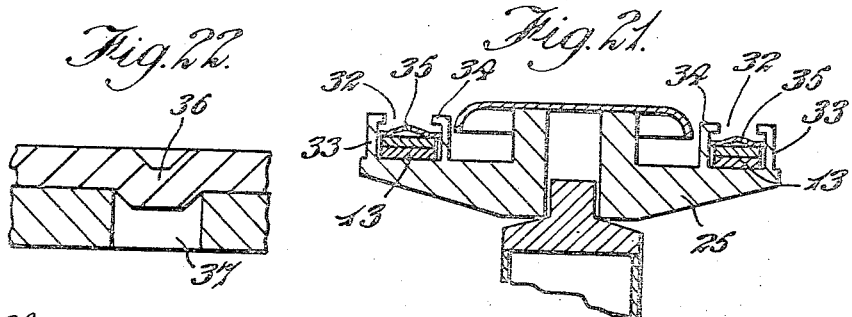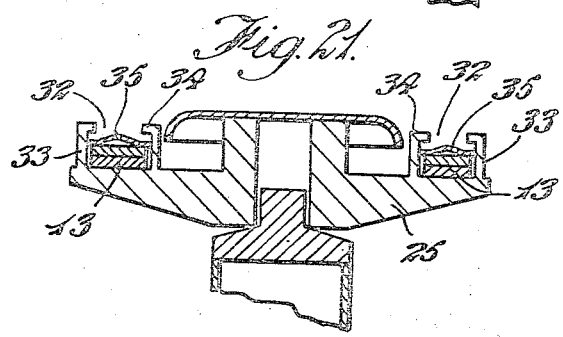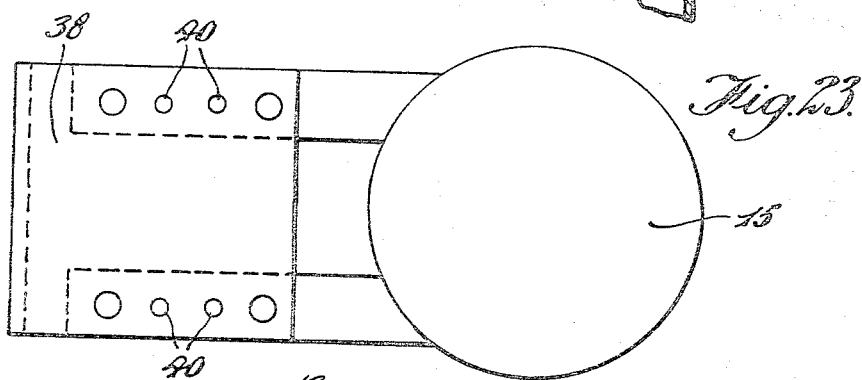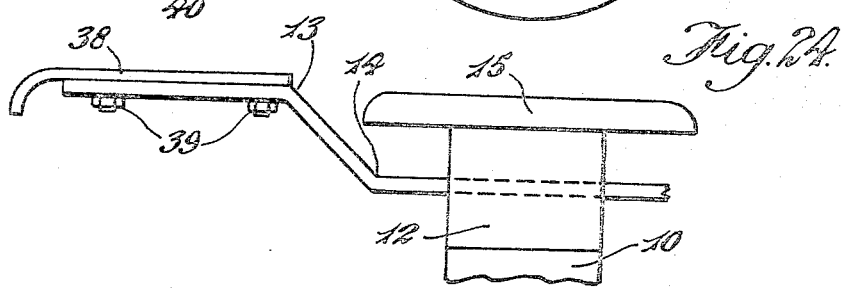

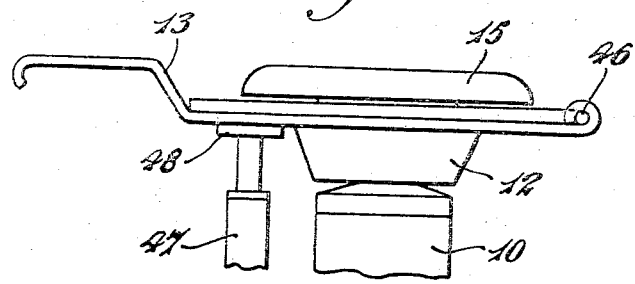
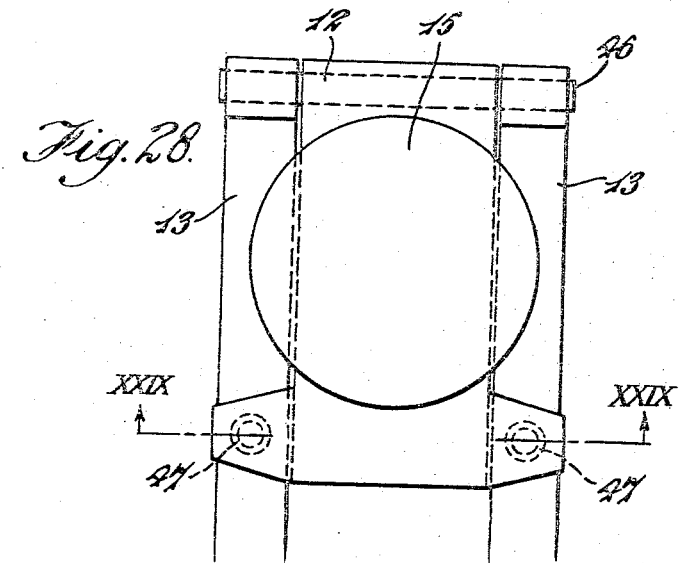
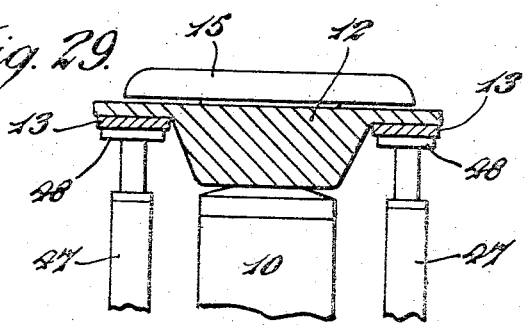

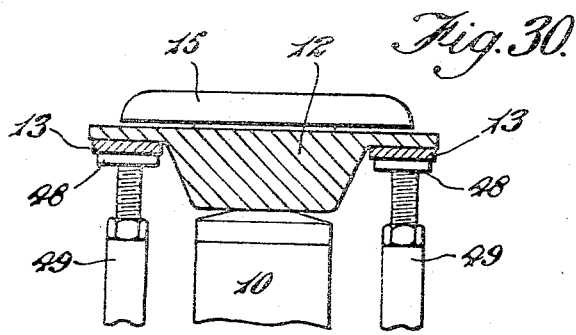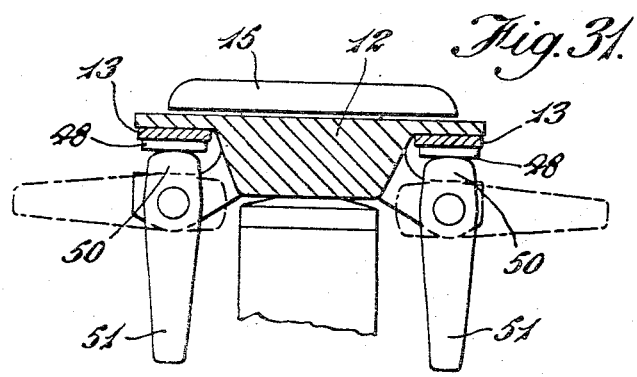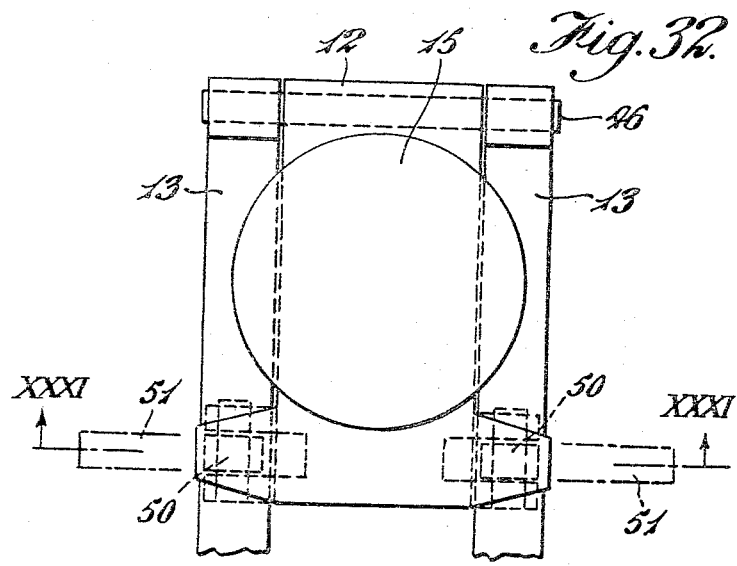

3,333,809
HYDRAULIC CHOCKS
Lewis Robert Bower, Chesterfield, England, assignor to A. G. Wild & Co. Limited, Sheffield, Yorkshire, England, a British company
Filed July 27, 1965, Ser. No. 475,179
17 Claims. (Cl. 248—357)

ABSTRACT OF THE DISCLOSURE

A supporting device for a mine roof having an extendable length jack forming the main support and one or more leaf like springs extending laterally from the head of the main support to provide a widened area of resilient support laterally of the main support.

---

This invention relates to a device for supporting the roof of a mine, the device being of the kind having a roof support member which extends to the front and rear of a main hydraulic support member or members in order to give an increased support area and to provide a roof support over the face conveyor and over the walkway.

An object of the invention is to provide an arrangement which will make the fullest possible use of the available head room in the seam, which is of particular advantage in the case of low or "thin" seams.

According to the present invention there is provided a roof support member for a hydraulic roof support for use in mining comprising a bar of spring steel arranged to be supported on a hydraulic support member.

The use of spring steel roof members carried out-board to the chocks, enables chocks with the maximum possible hydraulic stroke to be used. This is advantageous in so much as it gives greater ability to deal with seam convergences.

The use of spring steel roof members also provides a better and smoother means of negotiating irregularities in roof and floor. For example, a solid roof member or floor member would provide an inflexible abutment on contacting a step or irregularity in a mine roof or floor, a spring steel member has the necessary flexibility to negotiate such difficulties.

A predetermined amount of load may be set in the, or each roof support bar before it comes into contact with the roof which it is to support.

The, or each, roof support bar may be supported on or secured to a retaining member carried on the hydraulic support member and surmounted by a dished pressure plate.

The roof support member may include one or more roof bars. In the case of two or more roof bars they may be disposed in side-by-side relationship.

In all cases the, or each, bar may be additionally supported by a spring plate secured to the retaining member below the roof support bar and having upturned end arranged to bear on the lower surface of the roof bar and give additional support where necessary.

In the case where two main support members are provided the forward main hydraulic support member may be surmounted by the retaining member and dished pressure plate above referred to, while the rear main support member may be surmounted by a roof bar of the "canopy" type to which the roof bar is connected, as by a pin joint.

The objects and novel features of the present invention will be more clearly understood and appreciated from the following description of the various embodiments of the invention shown in the accompanying drawings in which:

FIGS. 1 to 17 illustrate various embodiments of the roof support members according to the present invention, FIG. 18 is a plan view of one method of mounting a roof support member on a hydraulic support member, FIG. 19 is a section taken on the line XIX—XIX indicated on FIG. 18, FIG. 20 is a plan view of another method of mounting a roof support member on a hydraulic support member, FIG. 21 is a section taken on the line XXI—XXI indicated on FIG. 20, FIG. 22 is a section taken on the line XXII—XXII indicated on FIG. 20, FIG. 23 is a plan view of a roof support member which is adjustable in length, FIG. 24 is a side view of the roof support member shown in FIG. 23, FIG. 25 is a side view of yet another method of mounting a roof support member on a hydraulic support member, FIG. 26 is a section taken on the line XXVI—XXVI indicated on FIG. 25, FIG. 27 is a side elevation of an embodiment permitting removal of the spring steel bars without disturbing the hydraulic support member, FIG. 28 is a plan view of the embodiment shown in FIG. 27, FIG. 29 is a section taken on the line XXIX—XXIX indicated on FIG. 28, FIG. 30 is a section similar to that shown in FIG. 29 showing an alternative arrangement, FIG. 31 is a section taken along the line XXXI—XXXI indicated on FIG. 32, and FIG. 32 is a plan view of the arrangement shown in FIG. 31.

The embodiment shown in FIG. 1 comprises a single main hydraulic support member 10 on which is supported a single roof support member 11. The roof support member 11 is mounted on a retaining member 12. The retaining member 12 is not shown in detail in any of these FIGS. 1 to 17 but it may in each case be similar to the means shown in detail in FIGS. 18 and 19 or in FIGS. 20 to 22, or in FIGS. 25 and 26. The roof support member 11 shown in FIG. 1 comprises a bar 13 of spring steel. The region of the bar where it is supported on the retaining member 12 is deformed inwardly as indicated at 14 so that the portion of the bar 13 supported on the retaining member 12 is contained in a plane which is below the upper surface of the bar 13 which contacts the roof to be supported. The retaining member 12 has a dished pressure plate 15 whose upper surface is substantially aligned with the upper surface of the spring steel bar 13. A predetermined amount of stress is applied to the spring steel bar 13 before the dished pressure plate comes into contact with the roof which it is to support. This preloading of the spring steel bar 13 has the advantage that whilst it primarily provides support to the roof over the conveyor and the walkway and prevents delamination of the strata, it ensures that the roof bar gives progressively greater support towards the pressure plate. Also, when the hydraulic support member 10 is lowered from the roof, the preloading tends to overcome any resistance in the hydraulic cylinders and so assist in the lowering of the hydraulic supports, and stability is maintained by the light spring pressure that can be maintained at all times during the advancement of the hydraulic support. Another advantage of the arrangement is that the positioning of the dished pressure plate 15 limits the loading on the spring steel bar 13 and is such that unless there are very large downwardly projecting portions of the roof adjacent the main hydraulic support member 10, the spring bar 13 cannot be overstressed.

FIG. 2 shows a modification of the roof support member 11 shown in FIG. 1. In this embodiment an additional spring steel plate 16 is secured to the retaining member 12, below the spring steel bar 13, and has upturned ends 17 which are arranged to bear on the lower surface of the bar 13 to give extra support where necessary. The chain dotted lines shown in FIGS. 1 and 2 indicate the predetermined amount of stress which is set in the spring bars 13 before they come into contact with the roof.

FIG. 3 is a plan view of the spring steel bar 13 shown in FIGS. 1 and 2 where a single continuous spring steel bar 13 forms the roof support member 11.

FIG. 4 is a plan view of an arrangement similar in construction to the one shown either in FIG. 1 or in FIG. 2 in which two continuous spring steel bars 13, which are slightly narrower than the bars 13 shown in FIG. 3 are disposed in side-by-side relationship and form the roof support member 11.

FIG. 5 is a plan view of arrangement which again is similar in construction to the embodiment shown in FIGS. 1 and 2 in which three continuous spring steel bars 13 are disposed in side-by-side relationship. The bars 13 in this embodiment are slightly narrower than those shown in FIG. 4.

FIG. 6 is a plan view of an embodiment which is similar in construction to the one shown in FIG. 5 but with the central spring steel bar 13 divided lengthwise so that it terminates adjacent to the support member 12, the ends of the divided bar 13 either being clamped to or freely supported by the retaining member 12.

FIG. 7 is a plan view of an embodiment which is similar in construction to that shown in FIGS. 1 or 2 in which two main support members are provided. One main support member is similar to the hydraulic support member 10 used in FIGS. 1 and 2 and includes a retaining member 12 having a dished pressure plate 15. The other main support member 18 is surmounted by a roof bar 19 of the "canopy" type. The spring steel bar 13 which is similar to the one shown in FIG. 1 or 2 is continuous and is connected to the canopy 19 by means of a pin joint 20.

FIG. 8 is a plan view of another arrangement which is similar to that shown in FIG. 7 except that the single continuous spring bar 13 has been replaced by three spring bars 13 in the same manner as the embodiment shown in FIG. 5.

The embodiment shown in FIG. 9 is similar to the one shown in FIG. 8 except that the central spring steel bar 13 is divided into two pieces, as was the case in the embodiment shown in FIG. 6. The ends of the divided bar 13 which are adjacent to the dished pressure plate 15 may be clamped, or simply supported on, the retaining member 12. The divided portion 21 of the central bar 13 is shown chain dotted to indicate that it may be omitted if not required.

FIG. 10 illustrated yet another embodiment of the present inveniton. In this embodiment two hydraulic support members are provided, each having a retaining member 12 and a dished pressure plate 15. The pre-stressing of the spring steel roof bar 13 is shown by the chain dotted lines.

The embodiment shown in FIG. 11 is similar to the one shown in FIG. 10 except that additional spring steel support plates 16 are provided.

FIG. 12 is a plan view of either of the embodiments shown in FIGS. 10 or 11 where a single continuous spring steel bar 13 is provided.

FIG. 13 is a plan view of either of the embodiments shown in FIGS. 10 or 11 in which two spring steel bars 13 are provided, each of which are slightly narrower in width than the bar 13 shown in FIG. 12.

FIG. 14 is a plan view of either of the embodiments shown in FIGS. 10 or 11 in which the roof support member consists of three spring steel bars 13 disposed in side-by-side relationship. The centre bar 13 is divided along its length and the ends of the divided lengths adjacent to the hydraulic support members 10 may be clamped to or supported on the retaining member 12. Again the outer portions of the central bar 13 are shown chain dotted to indicate that they may be omitted if not required.

FIG. 15 is another plan view of either of the embodiments shown in FIGS. 10 or 11 in which the roof support member consists of three spring steel bars 13 disposed in side-by-side relationship. The bars 13 in this embodiment being continuous.

FIG. 16 illustrates in plan view how many of the embodiments shown in FIGS. 13, 14 and 15 can be combined with a half assembly of similar construction. The two assemblies are pin jointed together at 22 so that they work as one and give extra support at the rear, or goaf side of the seam.

FIG. 17 is a side elevation of an arrangement in which two hydraulic support members 10 support a roof member 11 and have a base member 23 which is similar in construction to the roof support member. The ends of the roof support member and the base member are bent inwardly towards each other in order to protect the rear hydraulic support member 10 against being buried as the mine roof is allowed to collapse.

It would be mentioned that this arrangement can be used with any of the previously described arrangements of roof support members 11 and that they may be used in pairs, as shown in FIG. 17, or singly depending on the mining conditions. A retaining strip may be secured to the bent ends of the roof support member and the base member as indicated by the chain dotted lines 24 shown on FIG. 17, such a base member 23 is useful where the floor is soft. It prevents damage to soft floors.

FIGS. 18 and 19 illustrate one embodiment of a retaining member 12 which is particularly suitable where the roof support member comprises two or more spring steel bars 13. In this embodiment the retaining member 12 comprises a rectangular plate-like member 25 having on its upper surface an upstanding pedestal or boss 26 to which is secured the dished pressure plate 15. A bore 27 extends through the pedestal or boss 26 and the plate 25 is adapted to be engaged by a circular end portion 28 of the hydraulic support member 10. The spring steel bars 13 lie on the upper surface of the plate-like member 25 and are secured thereto by clamping plates 29. When three spring steel bars 13 are provided in side-by-side relationship, the ends of the centrally disposed bar 13 rest on the upper surface of the plate-like member 25 between a pair of upstanding members 30 provided on the upper surface of the plate 25. The ends may be bent to form an eye through which passes a pin 30a engaged with the members 30. Alternatively the ends may simply rest on the member 25. The eye and pin connection described above for connecting a centre bar 13 to the retaining member 25 may be replaced by a simple U-bolt.

The embodiment shown in FIGS. 21 to 22 is similar in construction to the one shown in FIGS. 18 and 19 except that the spring steel plates 13 are retained on the upper surface of the plate-like member 25 by being received in a channel 32 formed by upstanding parallel walls 33 provided on the upper surface of the plate-like member 25, each upstanding wall 33 having an internal lip 34 which extends towards the other associated upstanding wall 33. The spring steel bar 13 disposed in the channel 32 is retained therein by wedges 35 which are formed of spring steel and which are inserted in the channel above the bar 13.

The spring steel bars 13 are provided with projections 36 (FIG. 22) which are adapted to engage in apertures 37 provided in the plate-like member 25.

FIGS. 23 and 24 illustrate an embodiment in which the outer ends of a pair of spring steel bars 13 are interconnected by a plate 38 which is secured to the bars 13 by bolts 39. A series of apertures 40 are provided in the plate 38 allowing the plate to be fixed in one of a number of positions determined by the apertures 40. Alternatively, the plate may be made slideable with respect to the bars 13.

FIGS. 25 and 26 illustrate a retaining member 12 which is suitable for supporting a single spring steel bar 13 with or without the support member 16. The retaining member 12 comprises a flat plate 41 having on its upper surface an upstanding pedestal or boss 42 to which is secured the dished pressure plate 15. The plate 41 is secured to a flange 43 provided on one end of the hydraulic support member 10 with the spring steel bar and member 16 interposed between them. On either side of the plate 16 and spring steel bar 13 are provided packings 44 through which extend the bolts 45 which serve to secure the plates 43, 41 together.

FIGS. 27 to 29 illustrate an embodiment in which the spring steel bars 13 can be removed from their operative position in contact with the roof without the need for disturbing the hydraulic support member 10 or the retaining member 12. This is useful where in very narrow seams the bars 13 may prevent the passage of a machine. In this embodiment the bars 13 are hinged at one end to the retaining member 12 by a pin 46. They are each maintained in contact with the retaining member 12 by a hydraulic cylinder 47 which acts on them through a pressure pad 48.

When the hydraulic pressure within the cylinder 47 is released the bars 13 may be swung downwardly about the pins 46, or alternatively if the pin is removable they may be removed completely from the member 12.

In the arrangement shown in FIG. 30 the hydraulic cylinders 47 are replaced by screw jacks 49.

FIGS. 31 and 32 illustrate an embodiment similar to that described with reference to FIGS. 27 to 29 except that the hydraulic cylinders 47 are replaced by cams 50 which are pivoted to the retaining member 12 and have arms 51 which serve to effect pivoting.

It will be seen that the upper end of the hydraulic support members 10 are tapered providing a bearing surface at the bottom of the circular end portion 28. This allows the roof support member 11 to rock slightly in all directions.

Where the head room of the seam is critical the spring steel bars 13 can be arranged to be secured to the retaining member 12 almost on the same level as the dished plate 15 instead of being spaced inwardly a short distance below it.

The spring steel bars 13 are thin in thickness and do not take up much of the working height of a seam. Where two support members are used they can be connected to the bars 13 and moved together along a seam. The bars are easily replaced in the event of being loaded beyond their elastic limit. Any excessive roof weight is taken by the main support members 10 which reduces the chance of overloading the bars 13.

When laying two or more springs together it is possible for the lower springs to be pre-loaded by the springs above. This means that before the springs come into contact with the roof the upper spring is trying to force the lower spring down. When the spring touches the roof, the roof substitutes the loading in the top spring and after some deflection takes place there will be no load in the upper spring and an increased load in the lower spring. When after further compression takes place the bottom spring will have a greater deflection in it than the top spring and therefore, the whole will carry greater loads than for the same deflection than would have been possible if both springs had been neutral free when they both first contracted to roof.

Whilst we have shown preferred embodiments of the invention, it will be understood that various other modifications and changes may be resorted to within the scope of the appended claims.

I claim:

1. A device for supporting the roof of a mine comprising a jack having an upper end and a lower end, means for extending the length of said jack, a retaining member carried on the upper end of the jack, a spring steel bar supported on the retaining member, said spring steel bar having an upper surface adapted to contact and support the roof of a mine, a plate carried on the retaining member being adapted also to contact the roof, the spring steel bar being positioned with respect to said plate such that a predetermined stress will be applied to said spring steel bar before the plate contacts the roof of the mine as the jack is extended.

2. A device for supporting the roof of a mine comprising a hydraulically actuated jack having an upper end and a lower end, a retaining member carried on the upper end of the jack, a spring steel bar supported on the retaining member, said spring steel bar having an upper surface adapted to contact and support the roof of the mine and a lower surface, a dished plate carried on the retaining member being adapted also to contact the roof, a predetermined stress being applied to the spring steel bar before the dished plate contacts the roof of the mine.

3. A device for supporting the roof of a mine comprising a hydraulically actuated jack having an upper end and a lower end, a retaining member carried on the upper end of the jack, a spring steel bar supported on the retaining member, said spring steel bar having an upper surface adapted to contact and support the roof and a lower surface, a dished plate carried on the retaining member being adapted also to contact the roof, a predetermined stress being applied to the spring steel bar before the dished plate contacts the roof, a further spring steel plate supported on the retaining member being provided below the spring steel bar, said spring steel plate having upturned ends which bear against the lower surface of the spring steel bar.

4. A device for supporting the roof of a mine as claimed in claim 2 in which the spring steel bar has one end secured to a roof bar of the canopy type by a pin joint.

5. A device for supporting the roof of a mine comprising a hydraulically actuated jack having an upper end and a lower end, a retaining member carried on the upper end of the jack, a spring steel bar having an upper surface adapted to contact and support the roof supported on the retaining member, said spring steel bar in the region where it is supported on the retaining member being deformed inwardly so that the portion of the spring steel bar supported on the retaining member is contained in a plane which is below the upper surface of the bar adapted to contact and support the roof, a dished plate carried on the retaining member being adapted also to contact the roof, a predetermined stress being applied to the spring steel bar before the dished plate contacts the roof.

6. A device for supporting the roof of a mine comprising a hydraulically actuated jack having an upper end and a lower end, a retaining member carried on the upper end of the jack, a plurality of spring steel bars supported on the retaining member and arranged in side-by-side relationship, each spring steel bar having an outer end and an upper surface adapted to contact and support the roof, plate means interconnecting the adjacent outer ends of the spring steel bars, means enabling said plate means to be adjusted in position so as to vary the effective lengths of the spring steel bars, a dished plate carried on the retaining member being adapted also to contact the roof, a predetermined stress being applied to the spring steel bars before the dished plate contacts the roof.

7. A device for supporting the roof of a mine as claimed in claim 6 in which the plurality of spring steel bars comprises three spring steel bars, the centrally disposed spring steel bar of the three being divided lengthwise into two pieces.

8. A device for supporting the roof of a mine comprising a hydraulically actuated jack having an upper end and a lower end, a retaining member carried on the upper end of the jack and having an upper surface, a series of bores being provided in its upper surface, a spring steel bar supported on the upper surface of the retaining member, said spring steel bar having an upper surface adapted to contact and support the roof and a lower surface, projections provided on the lower surface of the spring steel bar and engaging in said series of bores provided on the upper surface of the retaining member to prevent lateral movement of the spring steel bar, a dished plate carried on the retaining member adapted also to contact the roof, a predetermined stress being applied to the spring steel bar before the dished plate contacts the roof.

9. A device for supporting the roof of a mine comprising a hydraulically actuated jack having an upper end and a lower end, a retaining member carried on the upper end of the jack, a spring steel bar supported on the retaining member, said spring steel bar having an end and an upper surface adapted to contact and support the roof, hinge means for hingedly connecting the end of the spring steel bar to the retaining member, a releasable locking means carried by the retaining member to lock the spring steel bar in position in the retaining member, a dished plate carried on the retaining member and adapted also to contact the roof, a predetermined stress being applied to the spring steel bar before the dished plate contacts the roof.

10. A device for supporting the roof of a mine as claimed in claim 9 in which the releasable locking means comprises a hydraulically actuated locking device.

11. A device for supporting the roof of a mine as claimed in claim 9 in which the releasable locking means comprises a cam lever, and pivot means pivotally connecting the cam lever to the retaining member.

12. A device for supporting the roof of a mine comprising a hydraulically actuated jack having an upper end and a lower end, a flange provided on said upper end, a flat plate forming a retaining member, means connecting the flat plate to the flange provided on the upper end of the jack, a spring steel bar interposed between the flat plate and said flange, said spring steel bar having an upper surface adapted to contact and support the roof, a dished plate supported on the flat plate and adapted also to contact the roof, a predetermined stress being applied to the spring steel bar before the dished plate contacts the roof.

13. A device for supporting the roof of a mine as claimed in claim 12 further comprising packing members disposed on each side of the spring steel bar between the flat plate and said flange.

14. A device for supporting the roof of a mine comprising a hydraulically actuated jack having a circular upper end and a lower end, a rectangular plate forming a retaining member, said plate having an upper surface and a lower surface, a pedestal extending upwardly from said upper surface of the plate, a bore extending lengthwise through said pedestal and through said plate, said bore being engaged by the circular upper end of the jack, a spring steel bar supported on the upper surface of the plate, clamping means for clamping the spring steel bar to said rectangular plate, said spring steel bar having an upper surface adapted to contact and support the roof, a dished plate supported on said pedestal and adapted also to contact the roof, a predetermined stress being applied to the spring steel bar before the dished plate contacts the roof.

15. A device for supporting the roof of a mine as claimed in claim 14 further comprising pairs of spaced apart upstanding walls provided on the upper surface of the plate, a transversely extending lip on each wall directed towards the other wall of the pair, a channel formed by each pair of upstanding walls and associated lips, said spring steel bar being received in said channel, wedges inserted in said channel above the spring steel bar for retaining the spring steel bar in the channel.

16. A device for supporting the roof of a mine comprising a hydraulically actuated jack having a circular upper end and a lower end, a rectangular plate forming a retaining member, said plate having an upper surface and a lower surface, a pedestal extending upwardly from said upper surface of the plate, a bore extending lengthwise through said pedestal and through said plate, said bore being engaged by the circular upper end of the jack, three spring steel bars disposed in side-by-side relationship supported on the upper surface of the plate, each bar having an upper surface adapted to contact and support the roof, clamping means for clamping the two outer spring steel bars to the upper surface of the plate, the central spring steel bar being divided lengthwise into two lengths, each length of the central spring steel bar having an inner end supported in the upper surface of the plate, a dished plate supported on said pedetestal and adapted also to contact the roof, a predetermined stress being applied to the spring steel bars before the dished plate contacts the roof.

17. A device for supporting the roof of a mine as claimed in claim 16 in which the inner end of each length of the central spring steel bar is bent over to form an eye, a pin extending through the eye, means securing the pin to the plate.

References Cited
UNITED STATES PATENTS
3,218,812 11/1965 Wilkenloh _____ 61—45

FOREIGN PATENTS
1,313,965 11/1961 France.
969,664 10/1958 Germany.
865,922 4/1961 Great Britain.

ROY D. FRAZIER, *Primary Examiner.*

CHANCELLOR E. HARRIS, *Examiner.*

J. FOSS, *Assistant Examiner.*